E. N. HILLSGROVE
Ox Yoke.
No. 90,101.                                    Patented May 18, 1869.
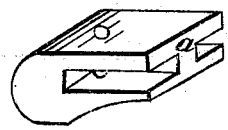
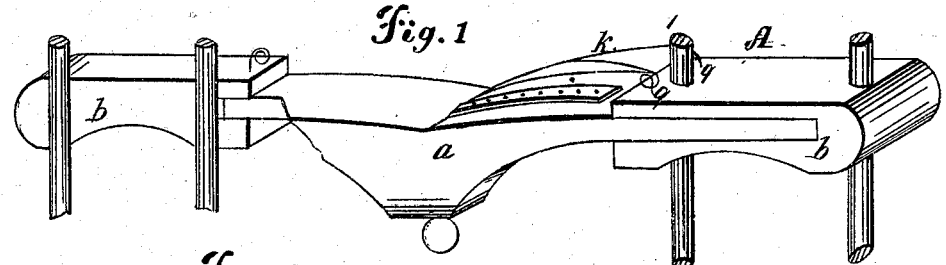
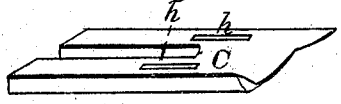
Witnesses;
Isaac A. Hill
Alfred Woodman
Inventor;
Edw. N. Hillsgrove
by Stenus Land
Atty.

United States Patent Office.

EDWARD N. HILLSGROVE, OF CONCORD, NEW HAMPSHIRE.

Letters Patent No. 90,101, dated May 18, 1869.

IMPROVEMENT IN OX-YOKES.

The Schedule referred to in these Letters Patent and making part of the same.

*To all whom it may concern:*

Be it known that I, EDWARD N. HILLSGROVE, of Concord, in the county of Merrimack, and State of New Hampshire, have invented a new and useful Improvement in Ox-Yokes; and I do hereby declare that the following is a full, clear, and exact description thereof, reference being had to the accompanying drawings, of which—

Figure 1 is an isometrical drawing, showing one end of my yoke, as prepared for use, and a section of the other end.

Figure 2 is a transverse section of the neck-piece.

Figure 3 is an isometrical drawing of the neck-piece.

Figure 4 is a drawing of the end of the beam of the yoke, which fits into the neck-piece.

For the purpose of enabling others skilled in the art to make and use my invention, I will proceed to describe its construction and mode of operation.

When my yoke is completed, both ends are alike, of course, and the end marked A, fig. 1, represents the completed yoke.

My yoke is made in three pieces, exclusive of the bows, viz, the beam $a$, fig. 1, and the neck-pieces $b\ b$, fig. 1.

The ends of my beam are forked, as shown at $c$, fig. 4, and the neck-pieces are constructed, as shown in the drawings, figs. 2 and 3, and the partition $d$, fig. 2, extends between the bows.

Upon the top of my beam, I place the hook-plate $e$, fig. 1, provided with holes, as shown in the figure.

Through the neck-pieces I pass the bows, and they are then slipped upon the beam.

The bolts $g\ g$ pass loosely through the neck-piece and beam, and are confined by a nut at the lower end thereof; and the beam is provided with slots, shown at $h\ h$, fig. 4, which will permit the neck-pieces to be moved upon the beam without taking out the bolts.

Upon the inner end of my neck-pieces, I provide the dog, or ratchet $k$, fig. 1, which may either operate with springs, or upon a hinge, and the inner end of which engages with the hook-plate, in the holes provided therefor, as shown; and, by means thereof, the neck-piece may be adjusted at any distance from the centre of the yoke.

By the use of my yoke, large and small cattle may be worked together, and the draught equalized, by adjusting the neck-pieces to give the advantage to the weaker animal; also, when used with cattle of equal strength, the yoke may be made long or short, to suit the convenience of the driver.

I claim as my invention, and desire to secure by Letters Patent—

A yoke, constructed with the beam $a\ a$, the hook-plate $e$, and the neck-pieces $b\ b$, and the dogs $k\ k$, combined, arranged, and adjusted as described, as and for the purposes described and set forth.

EDWARD N. HILLSGROVE.

Witnesses:
CHAS. C. LUND,
H. W. STEVENS.